United States Patent
Wu

(10) Patent No.: US 6,759,834 B2
(45) Date of Patent: Jul. 6, 2004

(54) PHASE-SHIFT MODULATION RESONANT INVERTER

(76) Inventor: Funing Wu, # 216 Bldg. 813, Zhongguancun, Beijing (CN), 100080

(*) Notice: Subject to any disclaimer, the term of this patent is extended or adjusted under 35 U.S.C. 154(b) by 0 days.

(21) Appl. No.: 10/235,775

(22) Filed: Sep. 5, 2002

(65) Prior Publication Data

US 2003/0231008 A1 Dec. 18, 2003

(30) Foreign Application Priority Data

Jun. 14, 2002 (CN) .......................... 02123307 A

(51) Int. Cl.[7] .............................................. G05F 1/00
(52) U.S. Cl. ........................................................ 323/217
(58) Field of Search .................................. 323/212, 214, 323/217, 218, 219

(56) References Cited

U.S. PATENT DOCUMENTS

| | | | | |
|---|---|---|---|---|
| 5,455,544 A | * | 10/1995 | Kechkaylo | 332/103 |
| RE35,829 E | * | 6/1998 | Sanderford, Jr. | 375/130 |
| 6,016,257 A | * | 1/2000 | Chang et al. | 363/17 |
| 6,160,434 A | * | 12/2000 | Yoshimura et al. | 327/238 |

* cited by examiner

Primary Examiner—Matthew V. Nguyen
(74) Attorney, Agent, or Firm—Wallenstein Wagner & Rockey, Ltd.

(57) ABSTRACT

A phase-shift modulation resonant inverter is turned on and off by built-in switches $Q_1$ and $Q_2$. An inductor L and a load capacitor C are used to produce vibration output from the inverter. A current sampling circuit is employed to take samples of resonant current. A controller is used to adjust the shift angle between the phase of switches $Q_1$ and $Q_2$ and that of resonance current. This invention features simple structure, flexible control and a wide range of voltage changes, with an efficiency up to 98%.

14 Claims, 5 Drawing Sheets

Fig.1 – Prior Art

PHASE-SHIFT MODULATION RESONANT INVERTER

FIELD OF THE INVENTION

The application relates to an inverter, particularly to a phase-shift modulation resonant inverter.

BACKGROUND OF THE INVENTION

Back-light inverter is widely used in notebook computers, instrumentation panels and other apparatuses in which LCD is employed. Under poor light or in total darkness, such inverter discharges a special AC voltage which makes a thin layer of film lighting at the back of the LC panel. The voltage frequency is several hundred Hertz (400 Hz–600 Hz) and the effective voltage ranges from several dozen to over one hundred volts. The back-light source is known as electroluminescent lighting (EL). Another type of back light source is fluorescent light with a working voltage frequency of 800–1,000 Hz and an amplitude of around 800 volts. The load of the above-mentioned back-light inverter is a small display panel and their output power ranges from 10 to several dozen volt-amperes. Simple free-running resonance circuit (see FIG. 1) is mostly employed and its efficiency is around 80%. Large pieces of electric vinyl film which came out in recent years calls for an inverter of much higher power for wider use in indoor lighting and large billboard lighting. A Canadian company by the name of Laservisions, for instance, came up with a luminous electric vinyl film as large as 2.2 m$^2$ in 1999 which requires the back-light inverter to have an output power of over 1,200 volt-amperes and a maximum effective AC output voltage of 220V in order to achieve 700LUX luminance of the film. Only when there is a highly effective inverter large pieces of luminous material can be put into practical and extensive use.

A series of technical problems occur when the existing technology is employed to design a high-power inverter. Due to limited efficiency of free-running resonance circuit, circuit loss reach to several hundred watts when output power is higher than 1,000 volt-amperes. Moreover, as resonance induction power increases, noise is very high because resonance frequency of around 500 Hz is well within the sensitive range. In the case of high-power operation, it is very difficult to use conventional methods (e.g. vacuum dipping, mechanical compression or epoxy sealing of transformer) to degrade the noise caused by magnetostriction inherent in magnetic materials. An alternative circuit employs high-frequency pulse width modulation (PWM) technology to eliminate the noise caused by the magnetic materials. However, this method causes high loss of power at high-frequency switching, resulting in an efficiency below 80%, because the frequency of back-light inverter's output voltage is 10 times that of AC power mains. Only when the switch modulation frequency is duly increased the distortion of sine-wave output voltage can be kept within tolerable range, resulting in higher switching loss. High heat loss and high temperature calls for strict ventilation and heat-sinking to ensure reliable performance of electronic components. Hence, high cost and sophisticated structure.

SUMMARY OF THE INVENTION

The object of invention is to provide a back-light inverter of high efficiency and low noise which is phase-shift modulation resonant inverter.

According to the invention, inverter comprises:

Switches $Q_1$ and $Q_2$ for turning on and off the inverter;

An inductor L and a load capacitor C for producing vibration output from the inverter;

A current sampling circuit for taking samples of resonance current;

A controller for adjusting the shift angle between the phase of switches $Q_1$ and $Q_2$ and that of resonance current.

This invention features simple structure, flexible control and a wide range of voltage changes, with an efficiency up to 98%.

PREFERRED EMBODIMENT OF THE INVENTION

Back-light inverter activates the electric vinyl film, the load of which is mainly capacitance connected in parallel with a high leakage resistance. Resonant inverter makes use of a fixed induction and load (equivalent parameter of the film) capacitance to form a resonance circuit. Its vibration frequency f equals to the output frequency of the inverter.

$$f = \frac{1}{2\pi\sqrt{L \cdot C}} \tag{1}$$

Where C is the value of load capacitance and L the value of induction. In the absence of resistance loss in the circuit, the circuit produces uniform vibration whose amplitude is determined by the energy of the capacitor and the inductor at the beginning of vibration. This may be expressed as:

$$\tfrac{1}{2}LI_m^2 = \tfrac{1}{2}CV_m^2 = \tfrac{1}{2}LI_0^2 + \tfrac{1}{2}CV_0^2 \tag{2}$$

Where $I_m$ and $V_m$ are the maximum current of the circuit and the maximum voltage of the capacitor during vibration. $I_0$ and $V_0$ are the initial current flowing through the inductor and the initial voltage at both terminals of the capacitor.

Actually, both load terminals of the capacitor are connected in parallel with a very high leakage resistance $R_c$, while the coil of the inductor is connected in series with a low resistance $R_L$. Together they form an attenuating vibration circuit. To maintain vibration of uniform amplitude, it is imperative to compensate the loss of resistance load by the energy from power source. When $\omega L \gg R_L$ and $R_c \gg 1/\omega C$ (where $\omega=2\pi f$), the vibration frequency is basically equal to resonance frequency f.

Figure 2:
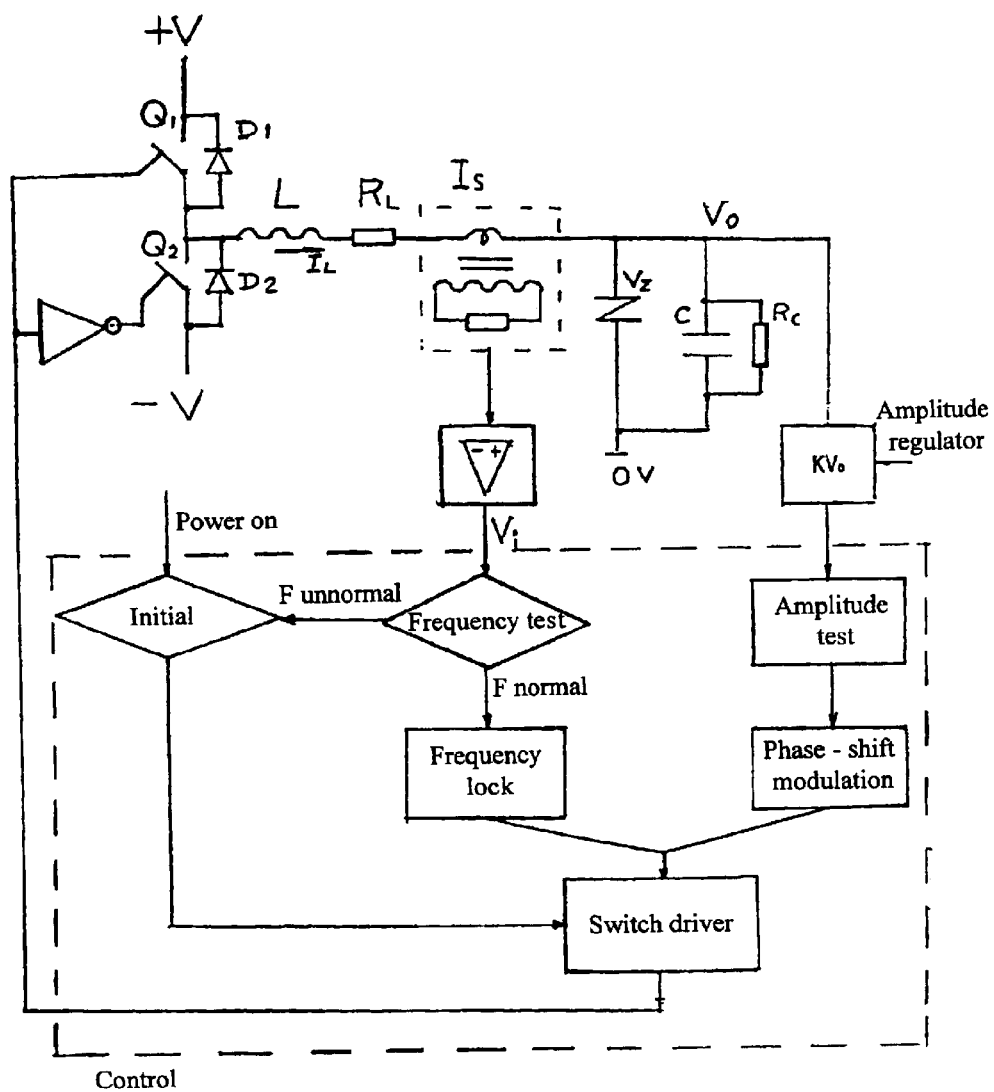
FIG. 2 is a graphical illustration of the circuit control of the present invention.

FIG. 2 is a schematic illustration of the phase-shift modulation resonant inverter. The energy being used to maintain uniform vibration is directly fed to the inductor L from power source +V and −V via switches $Q_1$ and $Q_2$. Details of the working principle and operation of the inverter circuit are as follows:

Initial Period. The objective is to check whether load (capacitor) is connected when power is ON and determine the resonance frequency, in preparation for normal operation of the inverter. Before operation, the voltage at both terminals of the capacitor, i.e., the voltage of the inverter output, is zero, $V_0=0$, the current on the inductor L is zero, $i_L=0$, the switches $Q_1$ and $Q_2$ are OFF and power +V and −V is ON. Operation starts with $Q_1$ ON, voltage +V is fed to both terminals of the inductor L. Induction current $i_L$ goes up from 0 at a tempo of $di/dt=V/L$. $i_L$ current flows to the load and charges the capacitor. Voltage $V_0$ at both terminals of the capacitor begins to climb from 0. After a period of time (less than half of the vibration period), the inductor and the capacitor store up a certain amount of energy. At this point, if $Q_1$ is OFF, current enters into a state of free attenuating vibration. Meanwhile, most of the energy is fed back to power source +V and −V via diodes $D_1$ and $D_2$. The vibration current flows through current sensor Is which converts current into voltage waveform and then logic potential Vi for the frequency test circuit which figures out the vibration period and judges if it falls within the normal working range (frequency being 400 Hz–600 Hz). Incorrect finding of the period shows the load being misconnected or not connected at all and the circuit does not go into normal operation. Not until the current sampling period falls within the set period range by means of repeated initial tests as mentioned above does the circuit go into normal operation.

Figure 1:
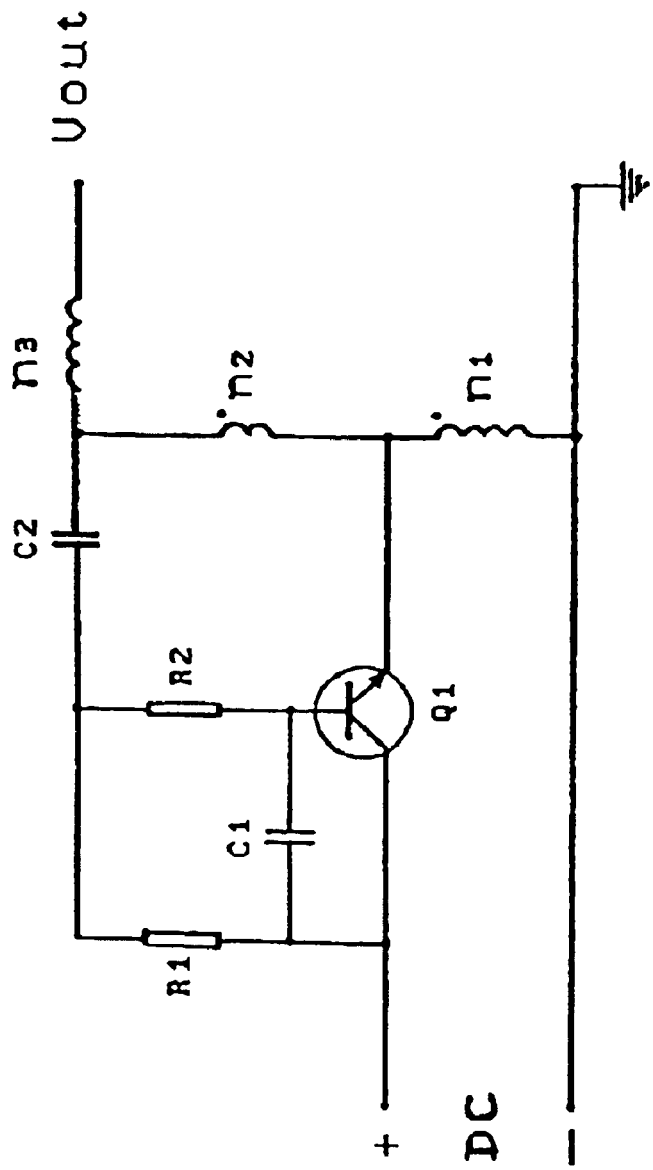
FIG. 1 is a schematic representation of the circuit based on the convention technology.
Figure 3:
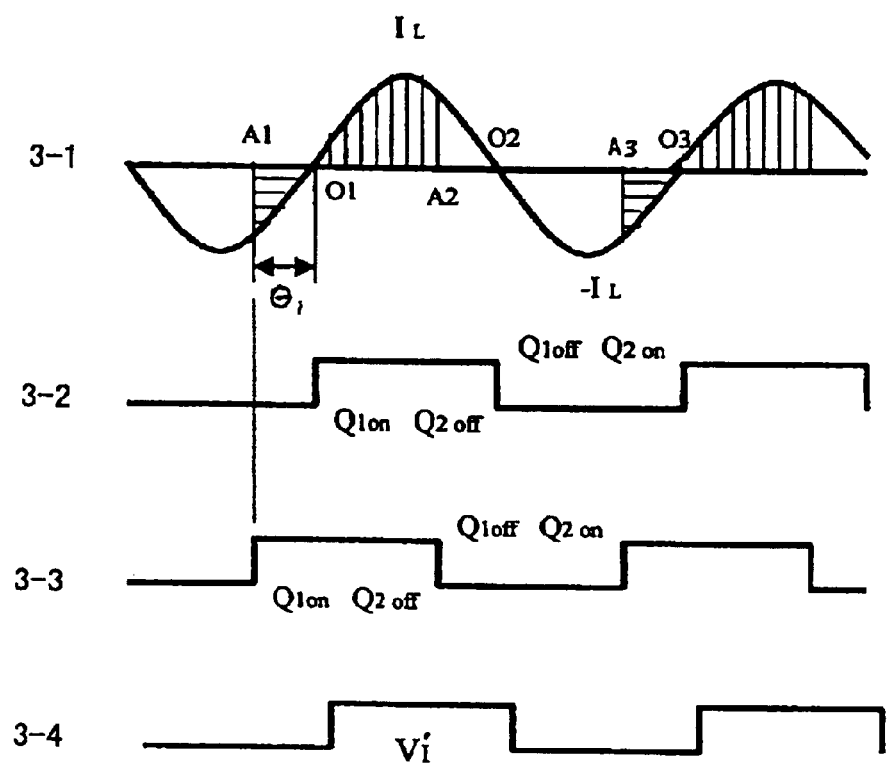
FIG. 3 is a sequential representation of phase-shift control.

Normal Operation Process. The objective is to maintain a stable output and at the same time regulate output amplitude as required. In the circuit of attenuating vibration, output can be kept stable if energy loss of the circuit in each period is replenished. When $Q_1$ is ON throughout the period of positive flow (in the direction of the arrow as shown in FIG. 2) of current $i_L$ on the inductor L, $i_L$ is supplied by +V power source; similarly, when $Q_2$ is ON with negative flow of $i_L$ (as shown in FIGS. 3-1 and 3-2), power source supplies the maximum power to the circuit and the system obtains the maximum output voltage $V_{om}$ and the maximum current $i_{Lm}$. The system's maximum input power $p_{im}$ is mainly used to offset its resistance loss (magnetic loss of the inductor is omitted in the computation):

$$P_{im}=I_{Lm}^2 \cdot R_L + V_{om}^2/R_C \quad (3)$$

Where $P_{im}$ is the maximum output of power source or the maximum input power of the system; $i_{Lm}$ is the maximum effective value of the inductor current; $V_{om}$ is the effective value of the maximum output voltage. When $R_c \gg \frac{1}{2\pi fC}$, load current $i_L$ mainly flows through the capacitor and its leakage current may be omitted. Hence, $$I_{Lm}=V_{om} \cdot 2\pi fC, \quad (4)$$

The maximum power $P_{im}$ (W) is derived by substituting the right-hand side of the formula (3) with (4).

$$P_{im}(W)=V_{om}^2[(2\pi fC)^2 R_L + 1/R_C](W) \quad (5)$$

$$\text{Maximum output power } P_O=V_{om} \cdot I_{Lm}=V_{om}^2 \cdot 2\pi fC (VA), \quad (6)$$

Efficiency should be related to output power Po and internal loss $P_{RL}$. The efficiency of the system circuit η may be expressed as:

$$\eta=P_O/(P_O+P_{RL})=[1/(1+2\pi fC \cdot R_L)] \times 100\% \quad (7)$$

As per relevant reference data, the capacitance of the largest film C is 10 μf. $R_c$=700 Ω and the designed frequency f=500 Hz. From formula (1) comes L=10 mH. Given the inductor line resistance $R_L$=0.5 Ω and the maximum output voltage $V_{om}$=220V, then $I_{Lm}=V_{om} \cdot 2\pi fC=220 \cdot 0.0314=6.9A$, internal loss $P_{RL}=I_{Lm}^2 \cdot R_L=24W$, load resistance loss $P_{RC}=V_{om}^2/R_C=69W$, output power $P_O=V_{om} \cdot I_{Lm}=1518VA$, total efficiency $\eta=P_O/(P_O+R_{RL})=1518/(1518+24)=98.4\%$.

The maximum power of power source $P_{RL}+P_{RC}$ is 93W= $P_{im}$, the average current of power source is $0.9I_{Lm}$ and $P_{im}=V \times 0.9I_{Lm}$. Power source voltage could be $V=P_{im}/0.9I_{Lm}=93/(6.9 \times 0.9)=15V$.

The above shows the adoption of low-frequency switching power source to compensate internal resistance and load resistance loss in the resonance circuit results in higher output voltage (220VAC) and higher output power (over 1,500VA) at low power source voltage (+−15V) and low power rate (less than 100W). This method is especially applicable to the capacitive load of large capacitance and working conditions under which load is stable in the course of operation. The above analysis of maximum power is a specific operation mode of phase-shift modulation with zero shift angle for computing the maximum power of power source and selecting the power source voltage. Loss at switches $Q_1$ And $Q_2$ is omitted because of the adoption of low-voltage (50V) MOSFET with an ON resistance of 5 mΩ only. When the maximum current reaches 7A, the conductive loss at switches is less than 0.25W. So the said loss in the circuit can be totally omitted. As to switching loss, it should be lower than resistance loss because both voltage and working frequency are low and soft switching technology is employed (to be described hereinafter).

In the resonance circuit, current and voltage vibrate in step with a certain frequency and fixed phase deviation. If the ON and Off period of switch $Q_1$ ($Q_2$) is consistent with the resonance period and the phase of switching staggers with the phase of current $I_L$, the output power of power source V can be adjusted together with the amplitude of the inverter output voltage. As shown in FIG. 3-3, the duration of time in which $Q_1$ and $Q_2$ are switched ON and Off staggers with the phase of $I_L$. The switching time of $Q_1$ shifts from $O_1$ and $O_2$ to $A_1$ and $A_2$. The switching time of $Q_2$ shifts from $O_2$ and $O_3$ to $A_2$ and $A_3$. The output power of power source +V is in direct proportion to the average value of the duration of time in which $I_L$ flows from $O_1$ to $A_2$. During the period of time from $A_1$ to $O_1$, $Q_1$ ON causes the reverse current $-I_L$ of the inductor L to flow to power source +V and feed the energy back to power source +V. The average output current from power source +V in $Q_1$ ON period should be equal to the area of $I_L$ from $O_1$ to $A_2$ (the part of FIG. 3-1 shaded in vertical lines) minus the area from $A_1$ to $O_1$ (the part of FIG. 3-1 shaded in horizontal lines) divided by half period of time T/2. Similarly, there is corresponding adjustment of the effective current supplied by power source −V. Decrease in circuit input energy inevitably leads to corresponding drop of output voltage and load current. Therefore, the output amplitude can be regulated by adjusting the phase-shift angle θ between the phase of $Q_1$ ON and $Q_2$ ON and that of current $I_L$.

Given the inductor current peak value being $I_{LP}$, the average value of the current supplied by power source +V should be the integral of the current waveform divided by T/2 vis-a-vis the period of time from $A_1$ to $A_2$. Given the average current being $I_{LA}$, then $$I_{LA} = \frac{I_{LP}}{\pi} \int_{-\theta}^{\pi-\theta} \sin\theta d\theta = \frac{I_{LP}}{\pi} \int_{\theta}^{\pi-\theta} \sin\theta d\theta$$

From this, it is derived as follows:

$$I_{LA}=(2 \cdot I_{LP}/\pi)\cos\theta \quad (8)$$

When θ=0, the maximum average current supplied by power source is: $I_{LA}=(2/\pi)I_{LP}=0.637 I_{LP}$ and the maximum output power is: $V \times I_{LA}$. When phase-shift angle $\theta > 0$ and $\theta < \pi/2$, the output amplitude is under control. When $\theta = \pi/2$, $I_{LA} = 0$, the average output power of power source is zero, equivalent to $A_1$ and $A_2$ shifting to the peak of current $I_L$, and the circuit gradually attenuates by free vibration until the energy drains off completely from the resistor. As a matter of fact, $I_{LP}$ in Formula (8) dwindles along with the increase of the phase-shift angle $\theta$. This is omitted in the computation, but the analysis is not adversely affected. When the period of $Q_1$ $Q_2$ ON goes on, i.e., $\theta > 90° \theta < 180°$, the energy which is fed back to power source will be greater than the output energy of power source (the area shaded in horizontal lines being larger than the area shaded in vertical lines). This is instrumental to speeding up the shut-down of the system with zero output voltage. If both $Q_1$ and $Q_2$ are switched off simultaneously, the current will send all energy back to power source via diodes $D_1$ and $D_2$, meaning a phase shift of 180°. This requires power source to have the capacity to absorb the current.

What is described above is the principle of phase-shift and modulation. In other words, the output voltage amplitude of the inverter is adjusted or changed by adjusting the phase-shift angle between "power source ON/OFF period" and "current vibration period" to control the output power of power source. Since the operation period of $Q_1$ and $Q_2$ must be consistent with the current vibration period and the adjustment of phase shift must refer to the phase of the inductor current $I_L$, current sensor is adopted to take samples of resonance current referred to as Is (see FIG. 2), convert it into logic potential Vi (see FIG. 3-4) and then send it to the input terminal of frequency test circuit. In order to bring about the adjustment of output voltage amplitude, output voltage Vo is fed to the input terminal of the amplitude test circuit via voltage divider KVo. The control circuit may have following features: 1. System resonance frequency and period as well as zero crossing points of current $I_L$ can be tested at frequency test circuit fed by current sampling logic potential $V_i$. By zero crossing points of current, they mean the points of output voltage peak value. 2. Amplitude test circuit chooses ON for the voltage of input terminal KVo during voltage peak value period, thereby measuring the voltage at that point. 3. End users can change voltage division ratio by means of amplitude regulator, so as to change the K value when output voltage Vo remains unchanged. Amplitude detection circuit keeps the KVo value unchanged by measuring the KVo value at regular intervals and adjusting the phase-shift angle of $Q_1$ and $Q_2$ vis-a-vis $I_L$ through phase-shift modulation circuit, thus making it possible to adjust voltage.

For example, if end users want to lower the amplitude of output voltage, they may increase the K value by means of amplitude regulator. As soon as the increased KVo value is detected, the amplitude test circuit shifts switches $Q_1$ and $Q_2$ to the left to widen the phase-shift angle and lower the output voltage Vo together with KVo. Phase shift stops when the amplitude test circuit finds KVo up to the set voltage and output voltage stabilizes at the newly decreased value. Similarly, voltage KVo drops when amplitude is modulated in the reverse direction; the phase-shift modulation circuit shifts the operation period of $Q_1$ and $Q_2$ to the right and narrows the phase-shift angle $\theta$ to increase Vo, thereby bringing KVo back to the standard value Vs.

The output voltage and power are lowered by means of widening phase-shift angle $\theta$ to the left. This is known as left-shift modulation in the phase-shift modulation method. As switching loss is minimized when switches $Q_1$ and $Q_2$ operate in the mode of left shift, $Q_1$ and $Q_2$ switch off when current flows through them and switch on when current flows through shunt diodes (current reverses and voltage at both terminals (Drain and Source) of MOSFET switches is zero 0V). This conforms to the working conditions for soft switching of MOSFET switches or zero-voltage switching (ZVS) with minimum switching loss. In the case of right-shift modulation, the result is just the opposite and switching loss rises markedly because it is concentrated in MOSFET switches in the course of switching on. This mode of control makes it possible to use small package (TO-220) field-effect transistor (FET) without heat sink even when output power goes up to 2,000VA. The power loss of components is below 0.3W.

Figure 4:
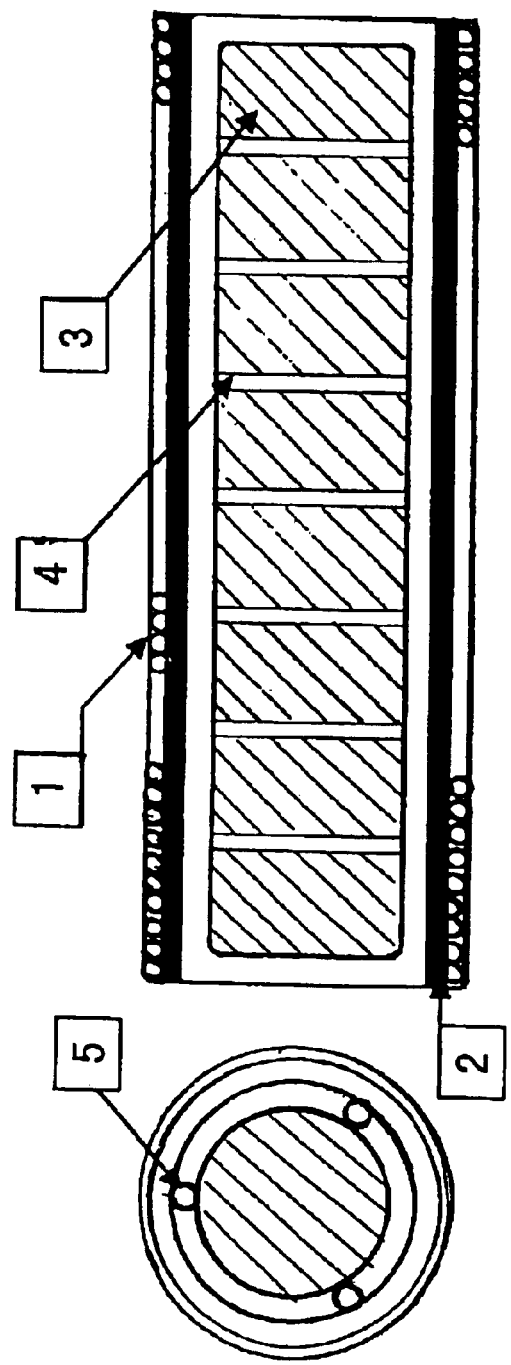
FIG. 4 shows the structure of the inductor.

The Structure of Inductor. As shown in FIG. 4, the problem of induction noise inherent in resonant inverter as a product of extensive application must be properly resolved. Major sources of noise are: 1. Magnetostriction of magnetic materials which stretch (material with positive magnetostriction coefficient, such as iron Fe) or shrink (material with negative magnetostrictioin coefficient, such as nickel Ni) in the direction of intensifying magnetic field. 2. When the inductor is built in such a way that there is air gap (for adjusting induction) in between sections of magnetic material, vibration noise is produced by the change of attraction between two sections of magnetic material. 3. Noise may also be produced by coil movement due to the acting force between inductor coil current and cross magnetic field. This noise may be basically eliminated by means of vacuum dipping to fix the coils.

Figure 5:
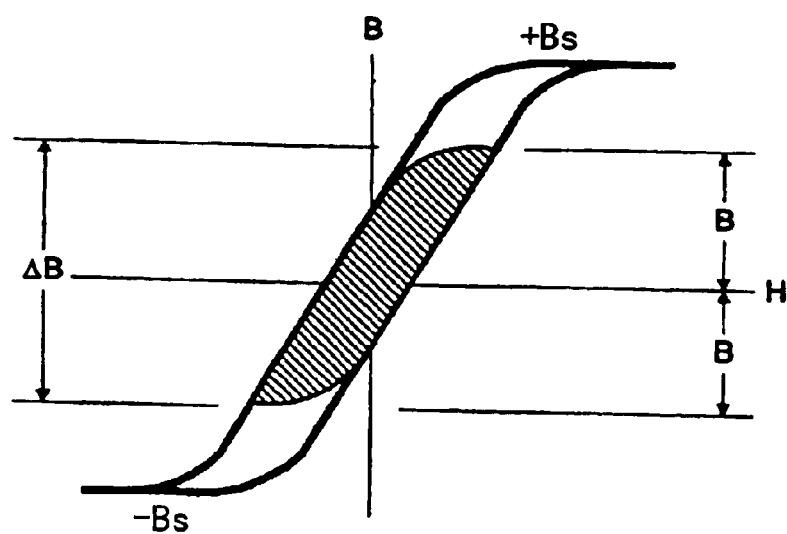
FIG. 5 is a graphical illustration of the operation features of the magnetic core of the inductor.

When resonance circuit is in operation, the magnetic material of the inductor having positive and negative direction works bilaterally and symmetrically. Such being the case, the flux density of magnetic material should change from −B to +B, the maximum change ΔB being 2B as shown in FIG. 5. B should be lower than saturation density Bs, so as to ensure linearity throughout vibration and consequently minimize distortion of output voltage waveform. To keep working area far away from saturating point can help reduce magnetic hysteresis loss as shown by oblique lines in FIG. 5. Take, for instance, B=0.7 Bs. When Bs is 5,000Gauss, B is 3,500 Gauss.

It is known that the voltage at both inductor terminals equals to AC output voltage, frequency is 500 Hz and AC effective value is 220 V. Given induction material being cylindrical with a diameter D of 3 cm, magnetic flux change from −B to +B is $\Delta\phi = 2B \times S$, S is the section area of magnetic bar: $S = \pi D^2/4 = 7$ cm$^2$.

It is known that the integral of the voltage at both terminals of the inductor vis-a-vis the duration of time equals to the product of magnetic flux change $\Delta\phi$ and the number of loops n in the induction coil:

$$n\Delta\phi = \left( \int_0^\pi V_p \sin\theta d\theta \times \frac{1 \text{ ms}}{\pi} \right) \quad (9)$$

Where $V_p$ is voltage peak value, $V_p = 220 \times \sqrt{2}$, 0 to $\pi$ integral is equivalent to the positive half period t=0−t=1 ms integral, which should be multiplied by 1 ms/$\pi$ in order to be replaced as duration of time.

$$\Delta\phi = 2BS = 2 \times 3500G \times 7 \text{ cm}^2 = 49000 G cm^2 \quad (10)$$

Formula to the right of (9)=$220V \times \sqrt{2} \times 2$ $ms/\pi = 198 V \cdot ms = 198000 V \cdot \mu \cdot S.$ \quad (11)

Since 100G=1 volt·$\mu$s/cm$^2$, substituting into (10)

$$\Delta\phi = 490 \ v \cdot \mu s \quad (12)$$

From (11) and (12), n=(11)/(12)=198000/490=404 loops

The above design of inductor is based on resonance frequency f and voltage amplitude $V_P$ and the number of loops is arrived at under the condition that magnetic material B and magnetic column diameter D (section area S) are selected. The value of inductor L is determined by resonance frequency f (or period T) and capacitor C.

When f=500 Hz and C=10 μf, L=10 mH

The selection of copper wire for the winding of the inductor depends on the current capacity and the allowable extent of coil heating. It is known that the maximum current is 6.9 A and no cooling fan is built in. According to the strict current capacity of 750cir mil/amp, AWG13# wire with a diameter of 1.9 mm is selected.

Experiment shows that induction is bound to be higher than 10 mH when 404 loops of wire are wound around a single piece of magnetic column with a diameter of 3 cm. This characteristic brings a lot of favorable factors to the design as shown in FIG. 4. Several sections of short magnetic bar may be selected and glued together to form a column with washers put in between sections. This is cheaper than a single piece of long magnetic column and induction value may be adjusted by changing the thickness of the washer. FIG. 4-3 are eight 2 cm-long magnetic bars with a diameter of 3 cm. 0.5–2 mm-thick glass fibre washers (FIG. 4-4) are inserted in between sections which are glued tight together, using epoxy, to form a magnetic column. 400-odd loops of enamel wire (FIG. 4-1) with a diameter of 1.9 mm are wound around plastic cylinder (FIG. 4-2). The magnetic column is inserted into the cylinder (FIG. 4-2). In this way, resonance induction can be accurately designed and manufactured as required. After vacuum dipping treatment of coil, noise caused by the coil can be completely eliminated. As each of the eight sections of magnetic bar is shorter than a single piece of long column and the inherent resonance frequency of the former is higher than that of the latter, the noise caused by magnetostriction is far away from 500 Hz. Moreover, proper selection of washer and glue also helps buffer and muffle noise.

Finally, there is a gap between the magnetic column and the inner wall of plastic cylinder to facilitate heat dissipation. Thin, long and round elastic material (FIG. 4-5) is inserted into the gap to position the magnetic column right in the center of the cylinder and enable the column to come into soft touch with the inner wall of the cylinder. As a result, the vibration of the magnetic column acts upon the cylinder through a buffer action instead of directly acting upon it, thereby lessening noise spread. Thanks to the above-mentioned technological processes of treatment, induction noise is reduced noticeably and meets the requirement for practical application. Further improvement is envisaged by selecting better material and technology. For example, both sides of the cylinder could be sealed with covers so long as dissipation of heat from magnetic column is not adversely affected, so that the horizontal vibration of the cylinder cannot spread through the two ends of the cylinder.

What is claimed is:

1. A phase-shift modulation resonant inverter for powering a luminous electric vinyl film, comprising:

Switches $Q_1$ and $Q_2$ for turning on and off the inverter at a low frequency;

An inductor L and a load capacitor C for producing vibration output from the inverter, the vibration output operably connected to the vinyl film;

A current sampling circuit for taking samples of resonance current;

A controller for adjusting the shift angle between the phase of switches $Q_1$ and $Q_2$ and that of resonance circuit.

2. The inverter according to claim 1, wherein the ON/OFF period of switches $Q_1$ and $Q_2$ and the resonance period of the inverter are equal.

3. The inverter according to claim 1, wherein said switches $Q_1$ and $Q_2$ being connected in parallel with a diode.

4. A phase-shift modulation resonant inverter comprising:

a switch $Q_1$ and a switch $Q_2$, for turning on and off the inverter;

an inductor L and a load capacitor C for producing vibration output from the inverter;

a current sampling circuit for taking samples of resonance current;

a controller for adjusting the shift angle between the phase of switches $Q_1$ and $Q_2$ and that of resonance circuit;

Initial test circuit for measuring whether the resonance frequency is within normal range at the beginning of operation;

Frequency test circuit for checking resonance frequency;

Frequency locking circuit for locking the working frequency within the normal range of resonance frequency;

Switch driving circuit for controlling the on-off action of the switches $Q_1$ and $Q_2$;

Amplitude test circuit for measuring the output amplitude of the inverter;

Phase-shift modulation test circuit for adjusting the phase of switches in line with the measured amplitude, thereby adjusting the output amplitude of the inverter.

5. The inverter according to claim 1, wherein a protective component which is connected to both terminals of the load capacitor.

6. The inverter according to claim 1, wherein said inductor being made up of several sections of magnetic core with washers in between.

7. The inverter according to claim 6, wherein said magnetic core being inserted into a coiled cylinder and the gap between the magnetic core and the cylinder being filled up with elastomer.

8. The inverter according to claim 6, wherein said washers being 0.5–2.0 mm thick.

9. A phase-shift modulation resonant inverter comprising:

a switch $Q_1$ and a switch $Q_2$, for turning on and off the inverter;

an inductor L and a load capacitor C for producing vibration output from the inverter;

a current sampling circuit for taking samples of resonance current;

a controller for adjusting the shift angle between the phase of switches $Q_1$ and $Q_2$ and that of resonance circuit; and Initial test circuit for measuring whether the resonance frequency is within normal range at the beginning of operation.

10. The inverter according to claim 1, further comprising a frequency test circuit for checking resonance frequency.

11. The inverter according to claim 1, further comprising a frequency locking circuit for locking the working frequency within the normal range of resonance frequency.

12. The inverter according to claim 1, further comprising a switch driving circuit for controlling the on-off action of the switches $Q_1$ and $Q_2$.

13. The inverter according to claim 1, further comprising an amplitude test circuit for measuring the output amplitude of the inverter.

14. The inverter according to claim 1, further comprising a phase-shift modulation test circuit for adjusting the phase of switches in line with the measured amplitude, thereby adjusting the output amplitude of the inverter.

* * * * *